(No Model.)
H. MAXIM.
METHOD OF RESTORING NITRATING ACIDS.
No. 479,988. Patented Aug. 2, 1892.
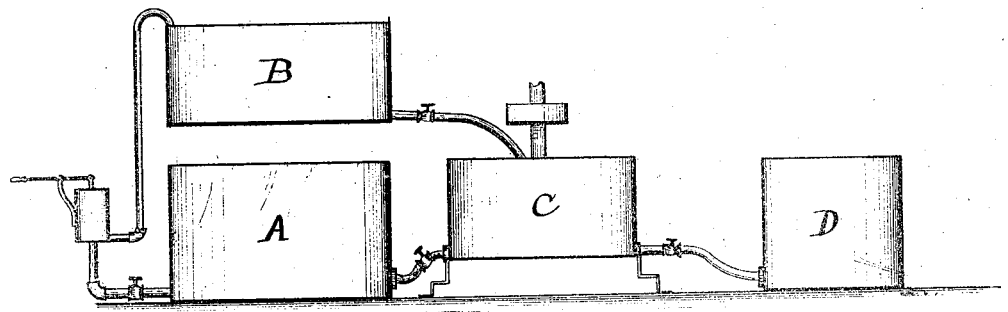
Witnesses.
M. Johnson.
W. L. Fatorner.
Inventor.
Hudson Maxim
By W. H. Bartlett, atty.

UNITED STATES PATENT OFFICE.

HUDSON MAXIM, OF NEW YORK, N. Y., ASSIGNOR TO THE COLUMBIA POWDER MANUFACTURING COMPANY, OF SAME PLACE.

METHOD OF RESTORING NITRATING ACIDS.

SPECIFICATION forming part of Letters Patent No. 479,988, dated August 2, 1892.

Application filed May 16, 1891. Serial No. 392,958. (No specimens.)

*To all whom it may concern:*

Be it known that I, HUDSON MAXIM, at present residing at New York city, in the county of New York and State of New York, have invented certain new and useful Improvements in Methods of Restoring Acids Expended in the Manufacture of Nitro-Explosives, of which the following is a specification, reference being had therein to the accompanying drawing.

My invention is chiefly designed to provide in a more simple, efficient, and economical manner than heretofore for the strengthening or restoration of the weakened or spent mixtures of nitric and sulphuric acids produced in the manufacture of nitro-substitution compounds of cellulose, sometimes called "nitric ethers"—that is to say, pyroxyline of the various degrees of nitration, such as di-nitro-cellulose, trinitro-cellulose, &c.—so that the said acid mixtures may be again used in such manufacture.

The drawing is a diagram indicating in a general way an arrangement of mechanism which may be used in carrying out my invention.

My invention is, however, also applicable for restoring or strengthening and utilizing the weakened or spent acids from the manufacture of nitro-glycerine; and my said invention, moreover, comprises the utilization of the spent acids from the manufacture of nitro-glycerine for the production of nitro-cellulose and nitro-glycerine.

The acids bath generally employed for the production of gun-cotton or trinitrate of cellulose has been a mixture of the strongest nitric and sulphuric acids obtainable in commerce—that is to say, nitric acid of 1.52 specific gravity and sulphuric acid of 1.84 specific gravity, usually mixed in the proportions of one part of nitric acid to three parts of sulphuric acid. About from ten to twelve pounds of such mixed acids are usually consumed or expended in the production of each pound of gun-cotton. The weakened or spent-acids mixture is unfit for further use in the production of the pyroxyline, because by reason of the quantity of nitric acid absorbed or taken up by the cellulose during its conversion into gun-cotton the proportion of nitric acid which remains in the acids mixture is too small as compared with that of the sulphuric acid, and also because the water evolved by the reaction renders the acids too dilute for further use.

By my invention I am enabled to utilize the aforesaid weakened or spent acids for the further and continued production of pyroxyline, as I provide for restoring the relative quantity of nitric acid necessary, and at the same time strengthening the acids mixture or rendering it more concentrated by diminishing the relative quantity of water, all as hereinafter explained.

In carrying my said invention into practice I mix with an excess of the said weakened or spent acids a quantity of a dried nitrate, preferably sodic nitrate, and then heat the mixture until the sodium nitrate or niter gives off its nitric acid and is converted into sulphate. I then allow the mixture to cool and the acid-sodium sulphate to crystallize out of solution. The acid-sodium sulphate in crystallizing absorbs from the acids a considerable portion of the water previously evolved during the conversion of the cellulose, and thereby renders the acids mixture more concentrated.

I have stated above that I heat the acids and nitrate mixture and allow it to cool; but I can obtain good results by mixing powdered nitrate with the said weakened or spent acids even when cold, or at a temperature of about 25° centigrade, or less. Although the reaction is not so complete or rapid as when heat is employed, yet a considerable quantity of nitric acid is evolved by the nitrate, and by the addition of strong sulphuric acid to render the acids mixture more concentrated very good results may be obtained.

In carrying out my invention after a portion of the weakened acids has been heated and the sulphate of soda allowed to crystallize then as much as practicable of the restored acids is drawn off from the crystals. The crystallized sodium sulphate retains or holds in suspension a considerable quantity of the acids, so that all the restored acids cannot be removed by simply draining. I therefore, after removing as much as possible of the restored acids from the crystallized sodium sulphate by draining, add another portion of the weakened or spent acids to wash out or take up the concentrated or restored acids left in the crystallized sodium sulphate. The sodium sulphate is then allowed to settle, the acids are drawn off, and the sodium sulphate is then preferably placed in a centrifugal machine, and as much as practicable of the remaining acids removed thereby. The acids thus used for washing the sodium sulphate are then mixed with nitrate and heated to restore them for further use in the production of gun-cotton.

According to a modification I place the sodium sulphate directly after the removal of a quantity of the restored acids therefrom by draining in a centrifugal machine, and thereby remove as much as practicable of the restored acids, and then allow a quantity of weakened or spent acids to pass through the centrifugal machine to further remove or wash out the acids which have been restored and which remain adhering to the sodium sulphate. The acids mixture after removal from the crystalline sodium sulphate is strengthened by the addition of concentrated sulphuric acid. Thus the liquid residuum which cannot be entirely removed from the crystalline mass will be of the weaker and not of the fully-restored acids.

I have hereinbefore referred more particularly to the employment of my invention for the restoration of the weakened or spent acids recovered in the manufacture of nitro-cellulose; but I have succeeded in obtaining very good results both in restoring the acids for further use in the manufacture of nitro-glycerine and in rendering the said acids available for the manufacture of nitro-cellulose or pyroxyline of any desired degree of nitration. This latter application of my invention is especially valuable in utilizing the waste acids from the manufacture of nitro-glycerine to produce pyroxyline suitable for the manufacture of nitro-gelatine.

It is obvious that my said invention is also applicable to the restoration or strengthening of the spent acids from the manufacture of lower nitro-compounds, the acids mixture being restored, as required, according to the desired degree of nitration of the cellulose or other substance.

The fumes or vapors of the nitric acid evolved by the application of heat in my process are condensed and allowed to flow back into the acids mixture, or the nitric acid thus evolved is redistilled and then returned to the acids mixture, thus increasing the concentration of the same.

In the treatment of the acids mixtures by my invention I sometimes employ a series of vessels or vats, as A, for containing the acids and in which the said acids may be treated with nitrate, and I arrange the said vessels or vats consequently with a centrifugal machine C, whereby the acids may be removed from the sulphate formed in the process. In some instances I provide an elevated tank, as B, from which the weakened acids mixture may be allowed to flow into the centrifugal machine to wash out the adhering restored acids from the sulphate contained therein, and these acids may be removed or allowed to flow to another tank, as D.

What I claim is—

The method of restoring mixed nitric and sulphuric acids which have become weakened in the production of nitro compounds, which consists in adding a quantity of dry nitrate to the weakened mixture, allowing the acid sulphate produced by this addition to crystallize, removing the liquid from the crystals by a centrifugal machine, and further washing the crystals by a portion of the weakened mixture, substantially as described.

In testimony whereof I affix my signature in presence of two witnesses.

HUDSON MAXIM.

Witnesses:
MORITZ LIPPMAN,
H. B. LIVINNEY.